R. M. RICE.
EXTRACTOR FOR AUTOMOBILES.
APPLICATION FILED MAY 15, 1915.
1,194,877.
Patented Aug. 15, 1916.
2 SHEETS—SHEET 1.
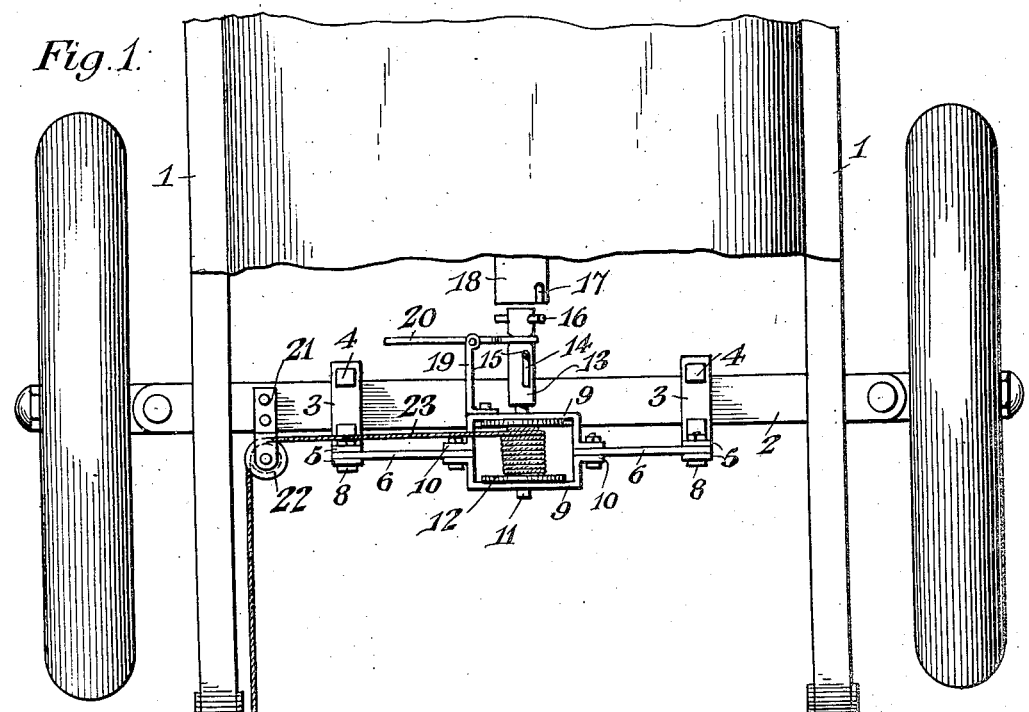
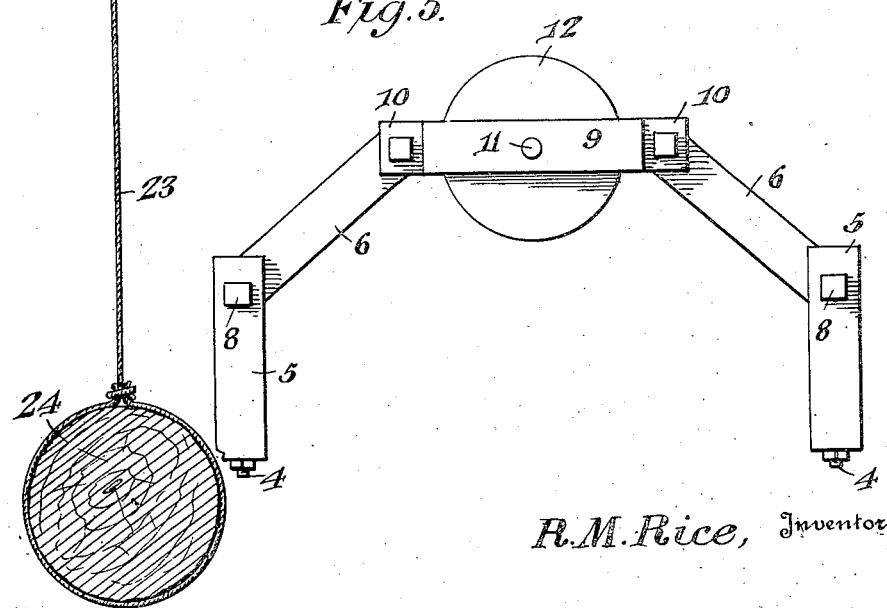

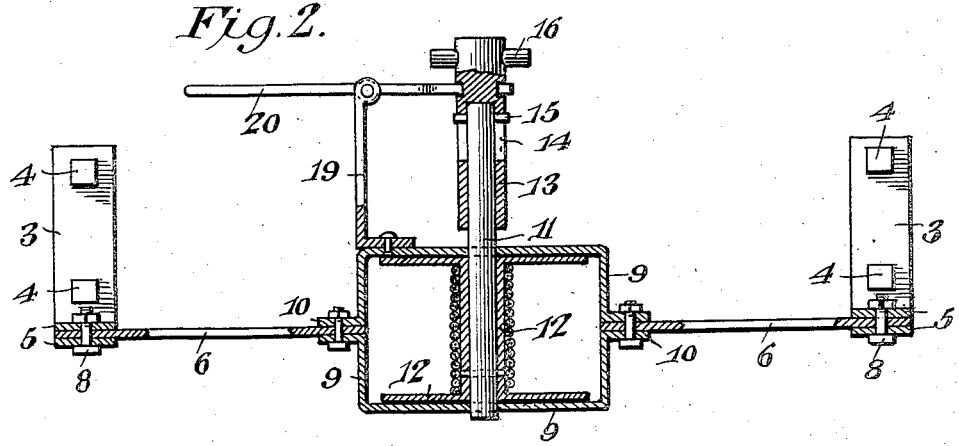
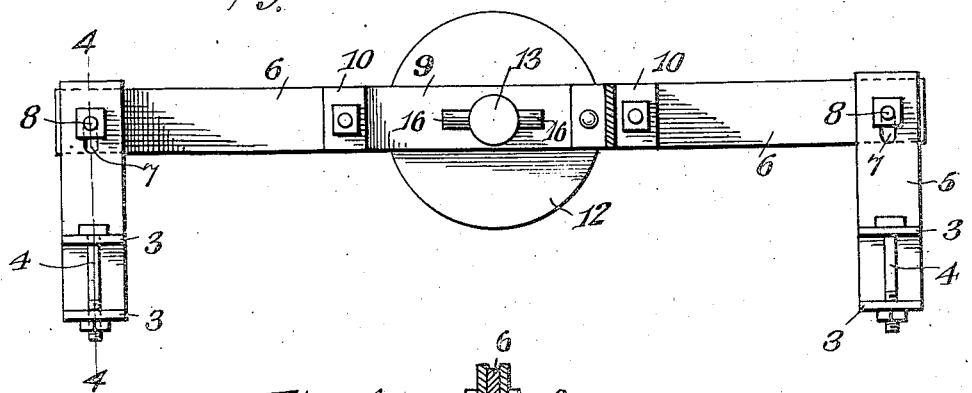
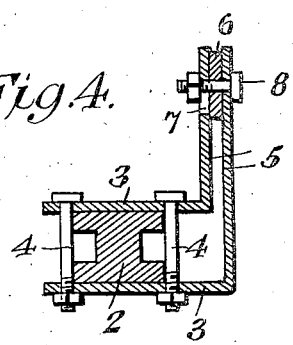

UNITED STATES PATENT OFFICE.

RICHARD MARVIN RICE, OF LIGHT, ARIZONA.

EXTRACTOR FOR AUTOMOBILES.

1,194,877.  Specification of Letters Patent.  Patented Aug. 15, 1916.

Application filed May 15, 1915. Serial No. 28,360.

*To all whom it may concern:*

Be it known that I, RICHARD MARVIN RICE, a citizen of the United States of America, residing at Light, in the county of Cochise and State of Arizona, have invented certain new and useful Improvements in Extractors for Automobiles, of which the following is a specification, reference being had therein to the accompanying drawing.

This invention relates to automobile extractors and has for its object the production of a simple and efficient means for facilitating the extracting of automobiles and other motor vehicles from a road or other highway.

Another object of this invention is the production of a simple and efficient means for facilitating the attaching and carrying of the extracting device by the front axle of the automobile and positioning the same in an efficient manner to be conveniently operated by the engine of the motor vehicle.

With these and other objects in view this invention consists of certain novel combinations, constructions, and arrangements of parts as will be hereinafter fully described and claimed.

In the accompanying drawings:—Figure 1 is a top plan view of a portion of the motor vehicle showing the extracting device applied thereto. Fig. 2 is a horizontal section through the drum mechanism and supporting braces or arms for the extractor. Fig. 3 is a rear elevation of the extracting frame, the bracket for supporting the clutch throwing arm being shown in section. Fig. 4 is a section taken on line 4—4, of Fig. 3. Fig. 5 is a front elevation of the extractor showing the arms positioned at a different angle from that shown in Fig. 3.

By referring to the drawings it will be seen that 1 designates the frame of the automobile, the front portion of which is supported upon the usual front axle 2. This front axle 2 is engaged by means of a pair of bracket arms 3 fitting over the upper and lower faces of the axle 2, and these arms are firmly held in engagement with the axle 2 by means of the bolts 4. The arms 3 are provided with upwardly extending parallel portions 5 between which parallel portions are secured the link members 6. One of the arms 5 is provided with a longitudinally extending aperture 7 for the purpose of receiving the binding bolt 8 which is adapted to extend therethrough and firmly hold the link 6 in a set or locked position. The inner end of each link 6 is connected to a frame 9, which frame is preferably rectangular in shape and comprises a pair of sections having their outwardly extending lip portions 10 fitting snugly over the inner ends of the arms 6. This structure is shown clearly in Fig. 2 of the drawings.

A shaft 11 is carried by the frame 9, and upon this shaft 11 is mounted a drum 12, which drum is fixedly secured to the shaft 11 so as to rotate therewith. A slidably mounted sleeve 13 is carried by the shaft 11, and this sleeve 13 is provided with a plurality of longitudinally extending apertures 14 through which the limit pin 15 which is carried by the shaft 11 projects. This limit pin 15 will limit the sliding movement of the sleeve 13 upon the shaft 11. This sleeve 13 is provided near its outer end with a plurality of laterally extending arms 16, which arms 16 are adapted to fit in the notches 17 formed in the usual crank shaft 18 of the engine adapted to be supported upon the frame 1 of the motor of the vehicle.

A clutch arm supporting bracket 19 is carried by the rear end of the frame 9, and a clutch arm 20 is pivotally supported upon this bracket 19 and engages the sleeve 13 to facilitate the reciprocation of the sleeve 13 upon the shaft 11 when so desired for throwing the same into or out of engagement with the shaft 18.

It should be understood that the frame 9 is especially supported upon the links 6 in the manner as illustrated in Figs. 2, 3 and 5 to permit the frame 9 to be raised to the desired elevation to suit the elevation of the crank shaft 18 of the automobile upon which the same is supported. It is, of course, well known that the crank shaft of different make automobiles or motor vehicles are positioned at varying elevations with respect to the front axle, and this, of course, will necessitate the adaptation of the extractor to the several elevations of the shaft with respect to the front axle of the automobile upon which the device is adapted to be applied. In Fig. 5 there is shown the manner in which the links 6 may be placed at an angle of approximately 45° with respect to the brackets 3 to support the shaft 11 in proper alinement with the shaft 18 of the automobile.

A plurality of arms 21 are supported within one end of the axle 2, and a pulley 22 is supported thereon, and an extracting cable 23 is wound upon the drum 12 and passes around the pulley 22 and is secured at its opposite end to a post, tree, or other rigid device 24 for the purpose of permitting the motor vehicle to be easily drawn forwardly out of a rut or other place in the road wherein it has been found difficult to extract the automobile or motor vehicle under the usual driving power imparted to the driving wheels thereof.

The operation of the present device is as follows: The sleeve 13 is reciprocated upon the shaft 11 for throwing the arms 16 into the notches 17 of the crank shaft 18 by means of swinging the arm 20. This will permit the drum 12 to rotate and wind the cable 23 thereon as the crank shaft 18 rotates and in this manner will pull the automobile forwardly toward the stay or post 24, thereby permitting the automobile to be readily and easily extracted from a rut or other bad place in the road or highway.

Of course, it should be understood that the device may be manufactured in any size and of any material, and other detail mechanical changes may be employed without departing from the spirit of the invention.

Having thus described the invention what is claimed as new, is:—

In combination with a motor vehicle provided with a front axle, a driving engine, a crank shaft, of a frame supported upon said front axle, a drum carried by said frame and having its longitudinal axis placed in direct alinement with said crank shaft, said drum provided with a forwardly projecting shaft, a sleeve mounted upon said last mentioned shaft and slidable thereon, means carried by said sleeve and adapted to engage said crank shaft for causing said drum to be directly driven from said crank shaft, and flexible means entirely passing around said drum.

In testimony whereof I hereunto affix my signature in presence of two witnesses.

RICHARD MARVIN RICE.

Witnesses:
 GEO. W. WATERS, Sr.,
 WILLIAM DODD.